US011747586B2

(12) United States Patent
Wilkins

(10) Patent No.: US 11,747,586 B2
(45) Date of Patent: Sep. 5, 2023

(54) VARIABLE BEAM SIZE VIA HOMOGENIZER MOVEMENT

(71) Applicant: Elemental Scientific Lasers, LLC, Omaha, NE (US)

(72) Inventor: Jay N. Wilkins, Belgrade, MT (US)

(73) Assignee: Elemental Scientific Lasers, LLC, Omaha, NE (US)

( * ) Notice: Subject to any disclaimer, the term of this patent is extended or adjusted under 35 U.S.C. 154(b) by 0 days.

(21) Appl. No.: 17/179,912

(22) Filed: Feb. 19, 2021

(65) Prior Publication Data

US 2021/0255414 A1    Aug. 19, 2021

Related U.S. Application Data

(60) Provisional application No. 62/978,516, filed on Feb. 19, 2020.

(51) Int. Cl.
   *G02B 7/02*     (2021.01)
   *H01J 49/16*    (2006.01)
   *H01J 49/04*    (2006.01)

(52) U.S. Cl.
   CPC .......... *G02B 7/023* (2013.01); *H01J 49/0418* (2013.01); *H01J 49/162* (2013.01); *H01J 49/164* (2013.01)

(58) Field of Classification Search
   CPC .... H01J 49/0418; H01J 49/162; H01J 49/164; G02B 7/023; G02B 3/0075
   See application file for complete search history.

(56) References Cited

U.S. PATENT DOCUMENTS 5,548,444 A * 8/1996 McLaughlin ...... G02B 27/0972
                                                359/837
6,172,329 B1 * 1/2001 Shoemaker .......... B23K 26/066
                                                219/121.69

(Continued)

FOREIGN PATENT DOCUMENTS

CN    203149208 U      8/2013
FR    3005753 A1 * 11/2014    ......... G02B 19/0014

(Continued)

OTHER PUBLICATIONS

Kim, T. et al., "Design of zoom homogenizer to control size of illumination filed," Opitical Engineering, vol. 57, No. 3, Mar. 24, 2018, 6 pages.

(Continued)

*Primary Examiner* — David E Smith
(74) *Attorney, Agent, or Firm* — Kevin E. West; Advent, LLP

(57) ABSTRACT

An ablation system for ablating a material can include a laser source, a set of homogenizing optics, and a homogenizing optics adjustment device. The laser source is for generating a laser beam. The set of homogenizing optics receives the laser beam and includes a first homogenizer and a second homogenizer. The homogenizing optics adjustment device carries the homogenizing optics, the homogenizing optics adjustment device configured to selectably adjust the position of at least one of the first homogenizer and the second homogenizer in order change a size of the laser beam, with a change in size of the beam changing the fluence thereof. The ablation system can be incorporated within a laser-ablation based analytical system, where the laser-ablation based analytical system includes a spectrometer.

16 Claims, 3 Drawing Sheets

(56) References Cited

U.S. PATENT DOCUMENTS

2008/0084612 A1* 4/2008 Bayer ................ G02B 27/0961
                                                                           359/623
2019/0371590 A1 12/2019 Wilkins et al.

FOREIGN PATENT DOCUMENTS

KR          101913654 B1 * 12/2018 ............. H01S 3/005
WO    WO-2014169394 A1 * 10/2014 ............. G01N 15/10

OTHER PUBLICATIONS

PCT International Search Report and Written Opinion for PCT/US2021/018731, dated Jun. 7, 2021.

* cited by examiner

VARIABLE BEAM SIZE VIA HOMOGENIZER MOVEMENT

RELATED APPLICATIONS

The present application claims domestic priority to U.S. Provisional Application No. 62/978,516, filed Feb. 19, 2020, and entitled "VARIABLE BEAM SIZE VIA HOMOGENIZER MOVEMENT." The contents of U.S. Provisional Application No. 62/978,516 are hereby incorporated by reference thereto.

BACKGROUND

Laser ablation Inductively Coupled Plasma Mass Spectrometry (LA-ICP-MS) or Laser ablation Inductively Coupled Plasma Optical Emission Spectrometry (LA-ICP-OES) techniques can be used to analyze the composition of a target (e.g., a solid or liquid target material). Often, a sample of the target is provided to an analysis system in the form of an aerosol (i.e., a suspension of solid and possibly liquid particles and/or vapor in a carrier gas, such as helium gas). The sample is typically produced by arranging the target within a laser ablation chamber, introducing a flow of a carrier gas within the chamber, and ablating a portion of the target with one or more laser pulses to generate a plume containing particles and/or vapor ejected or otherwise generated from the target (hereinafter referred to as "target material"), suspended within the carrier gas. Entrained within the flowing carrier gas, the target material is transported to an analysis system via a transport conduit to an ICP torch where it is ionized. A plasma containing the ionized particles and/or vapor is then analyzed by an analysis system, such as an MS, OES, isotope ratio mass spectrometry (IRMS), or electro-spray ionization (ESI) system.

DRAWINGS

The Detailed Description is described with reference to the accompanying figures.

Figure 1:
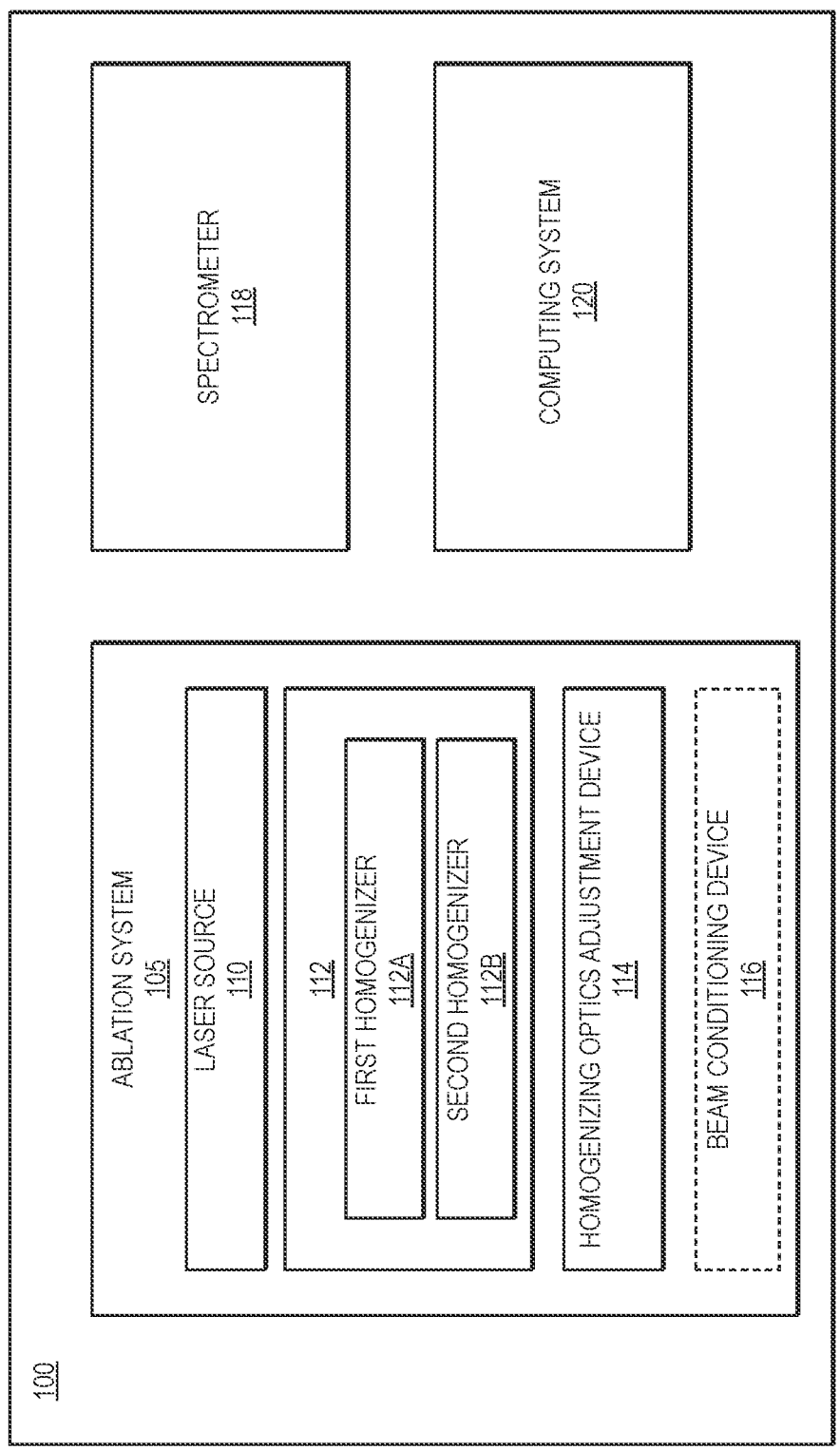

FIG. 1 is a schematic view of a laser-ablation based analytical system, according to an example embodiment of the present disclosure.

Figure 2A:
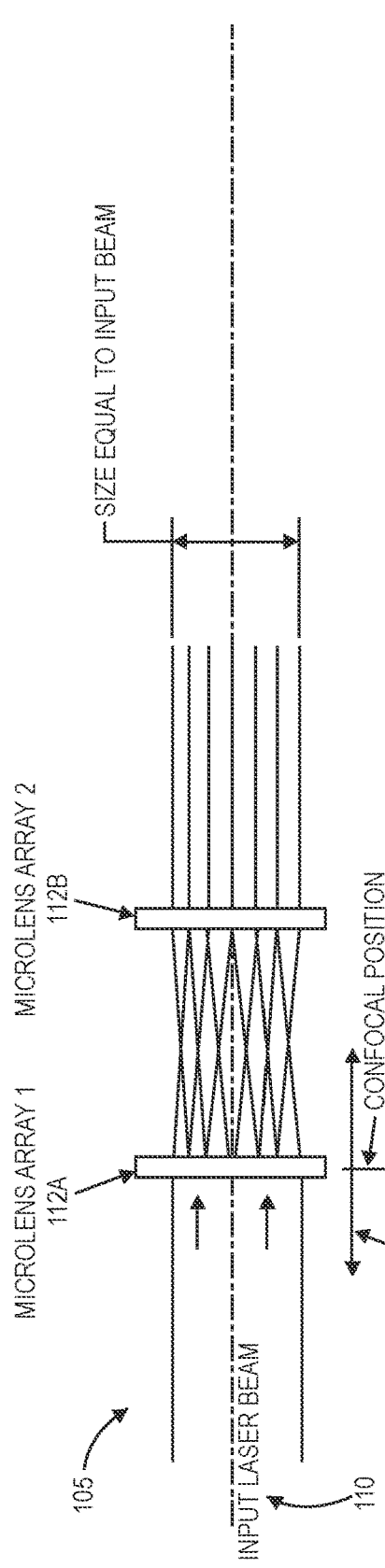
Figure 2B:
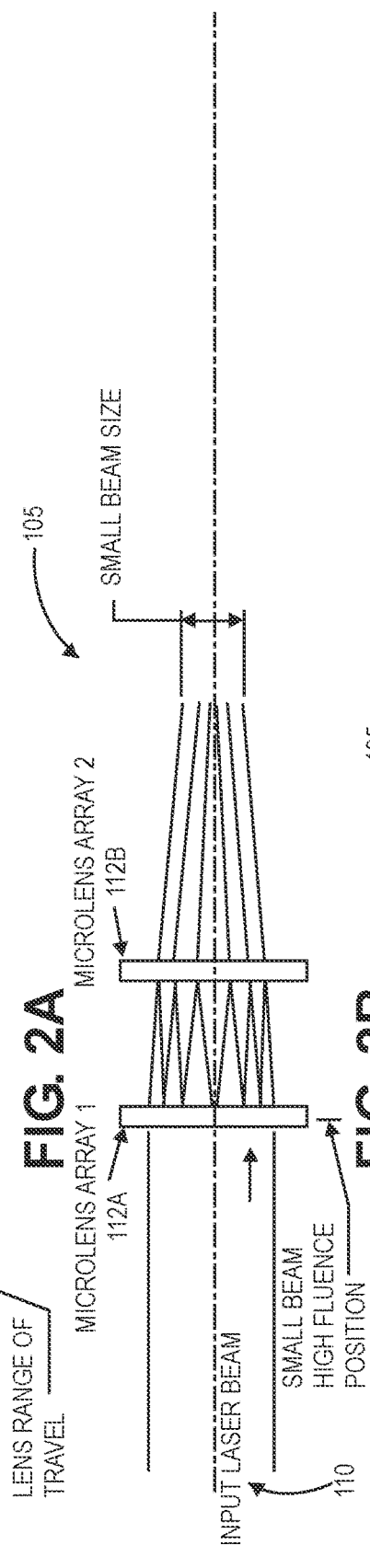
Figure 2C:
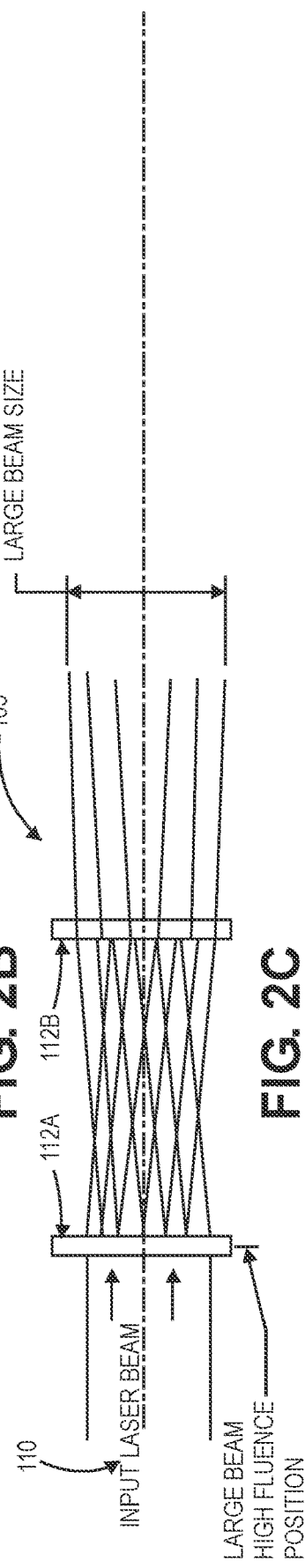

FIGS. 2A-2C are a series of schematic views of a laser source, the pair of homogenizing optics (a first homogenizer; and a second homogenizer), and a homogenizing optics adjustment device of the laser-ablation based analytical system shown in FIG. 1, where FIGS. 2A-2C, respectively, illustrate a confocal position, a minimum beam size position, and a maximum beam size position associated with the homogenizing optics adjustment device.

Figure 3A:
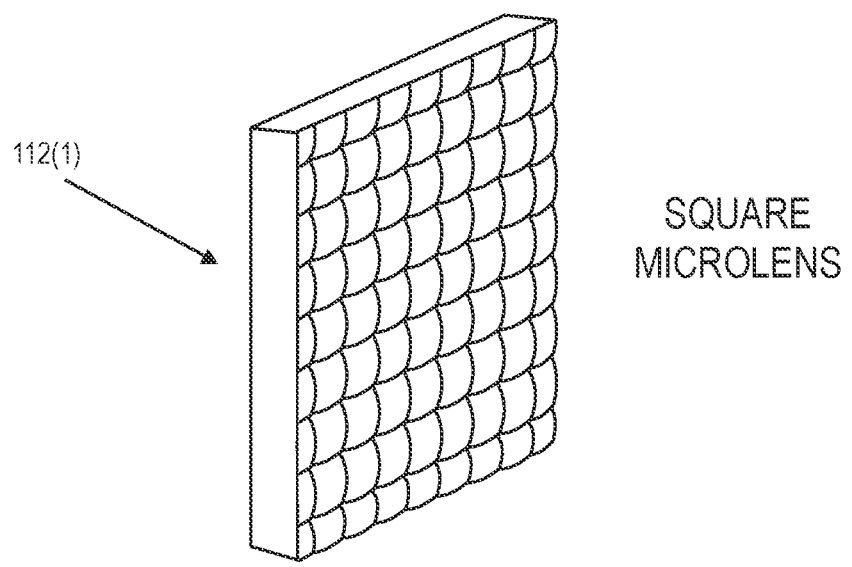
Figure 3B:
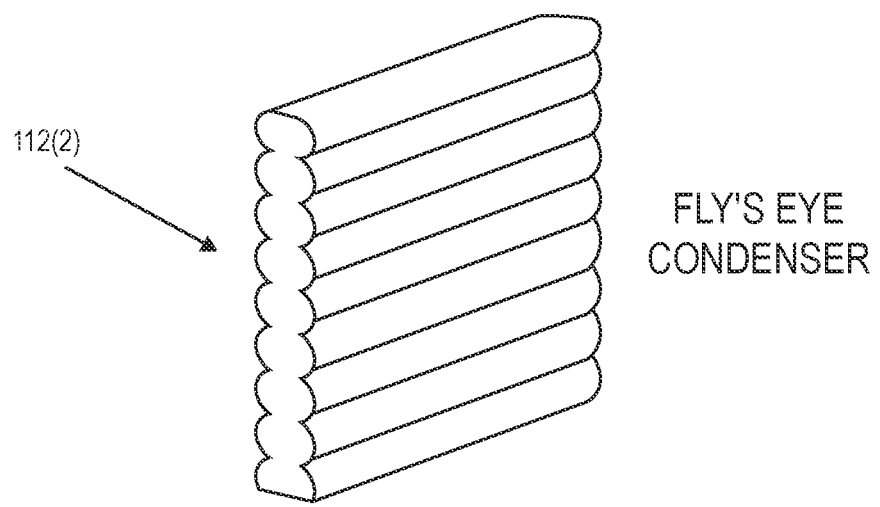

FIGS. 3A and 3B are schematic, isometric views of, respectively, a square array microlens and a fly's eye microlens condenser that can be used for the homogenizing optics illustrated in FIGS. 2A-2C.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope.

Overview

The current state of the art for the laser ablation portion of a laser-ablation based spectrometry system has been to use two fly's eye homogenizing (lens set) optics (e.g., used in pairs) to homogenize the laser beam. This method of beam homogenization has only been shown to work on 193 nm excimer-based (i.e., an ultraviolet (UV) laser that uses a compound of noble gases, halogen, etc., as its laser medium) laser ablation systems and has only been used on the higher energy systems, such as those manufactured by Teledyne, Coherent, or Applied Spectra. The understanding is that each of these companies uses the dual fly's-eye homogenization method in their systems. None of them implement any method of moving one of these devices to control the laser beam parameters and thus change the working parameters of the system.

In the process of developing a high energy ablation system, it has become clear there are at least two major use cases desired by customers. One is the production of much larger ablation spots with medium energy density, and the other is the production of smaller ablation spots with much higher energy density or fluence. In optics, the fluence F, for example of a laser pulse, is the optical energy delivered per unit area. Its most common units are J/cm2 (joules per square centimeter). In an attempt to achieve a very high energy density and meet the large spot requirement, it was discovered that, in an embodiment, it was possible to selectively increase or decrease the energy density at the sample by moving the first of two homogenizing optics in the system beam train. In an embodiment, this optic adjustment system can be motorized. Such a motorized adjustment system can be controllable via software and have at least two modes (e.g., position/energy density).

From a pure optical standpoint, this concept can be considered analogous to an adjustable telescope. However, for laser ablation for mass spectroscopy, the use of movable optics to selectively increase or decrease the energy density has not been previously employed. Further, there is no evidence of such adjustable optics being used for general ablation, photoetching, or micromachining.

Example Implementations

FIG. 1 illustrates a laser-ablation based analytical system 100, in accordance with an example embodiment of the present disclosure. The laser-ablation based analytical system 100 can include an ablation system 105 for ablating a target (not shown) of a sample material, where the ablation system 105 includes a laser source 110 (e.g., an excimer laser), a pair of homogenizing optics 112 (a first homogenizer 112A; and a second homogenizer 112B), a homogenizing optics adjustment device 114, beam conditioning optics 116 (e.g., reflective or partially reflective surfaces and/or windows for decreasing aberrations and/or expanding the beam); a spectrometer 118 (e.g., an optical emission spectrometry (OES) or mass spectrometry (MS) system) to permit chemical analysis of a laser-ablated sample (e.g., sample ablated using the ablation system 105); and a computing system 120 to control the operation of the overall system 100. An example of overall laser-ablation based analytical system is illustrated in U.S. Patent Publication No. 2019/0371590 A1, the contents of which are hereby incorporated by reference thereto, as the present disclosure concentrates on the ablation system 105. While the ablation system 105 is illustrated as part of the laser-ablation based analytical system 100, it is to be understood that the ablation system 105 may be separately used to ablate materials other than a sample material to be analyzed and/or not used in the context of a laser-ablation based analytical system. In an embodiment, the spectrometer 118 can be configured to receive and analyze the material ablated by the laser.

The first homogenizer 112A for first receiving the laser beam of the ablation system 105 can be in the form of a first microlens array, and the second homogenizer 112B for receiving the laser beam after first being refracted by the first homogenizer 112A can be in the form of a second microlens array. In an embodiment, the first microlens array is configured the same as the second microlens array. In an embodiment, a given first homogenizer 112A and/or a given second homogenizer 112B can be in the form of a square microlens array 112(1), as illustrated in FIG. 3A (e.g., a two-dimensional array of microlens extending latitudinally and longitudinally). In an embodiment, a given first homogenizer 112A and/or a given second homogenizer 112B can be in the form of a fly's eye microlens array 112(2), as illustrated in FIG. 3B (e.g., a monolithic assembly of dual-surface cylindrical microlenses, arranged in a one-dimensional array). It is to be understood that other microlens array arrangements may be possible (e.g., hexagonal array of microlenses or rectangular array of microlenses) and are within the scope of the present disclosure.

The first homogenizer 112A and the second homogenizer 112B can be movably mounted relative to one another, as shown in FIGS. 2A-2C (e.g., at least one of the homogenizer 112A or the second homogenizer 112B selectably movable relative to the other). Such selectable movement of at least one of the first homogenizer 112A or the second homogenizer 112B relative to the other can be achieved using the homogenizing optics adjustment device 114. The homogenizing optics adjustment device 114 can be in the form of a mechanical adjustable carrier (e.g., rack and pinion; slide mount; etc.). In an embodiment, the homogenizing optics adjustment device 114 can include a fixture (not shown) for each of the first homogenizer 112A and the second homogenizer 112B and an adjustable mechanism (not shown) for selectably moving at least one of the first homogenizer 112A or the second homogenizer 112B relative to the other. In an embodiment, the homogenizing optics adjustment device 114 can allow for precise movement of the first homogenizer 112A axially (parallel) to the laser beam. The laser beam (not labelled) generated by the laser source 110 can be directed to the pair of homogenizing optics 112, with its size adjusted thereby (as discussed later in more detail), before proceeding through any beam conditioning optics 116 and ultimately impacting a sample or other material to be ablated. FIGS. 2A-2C, respectively, illustrate a confocal position, a minimum beam size position, and a maximum beam size position for the pair of homogenizing optics 112, as dictated by the positioning of the homogenizing optics adjustment device 114. In an embodiment, upon passing through the homogenizing optics 112 and any beam conditioning optics 116, the laser beam can impact upon and ablate a material/sample.

The homogenizing optics adjustment device 114 of the ablation system 105 can be either motorized or nonmotorized and can be variable in position (i.e., allowing the relative positioning between the first homogenizer 112A and the second homogenizer 112B to be changed). Upon movement of the first homogenizer 112A, for example, the beam size (e.g., a beam diameter; or a beam cross-section) at the aperture plane can be varied, thereby resulting in a higher fluence at the sample (ablation) site. By being variable in position, the beam size can be adjusted, as desired, to any size in a range including the minimum and maximum beam size. Adjusting between the confocal beam size and the minimum beam size can be considered to serve as a first mode, in which the beam size (e.g., beam cross-sectional area) is decreased but in which the energy density is increased over that at the confocal position. Conversely, adjusting between the confocal beam size and the maximum beam size serves as a second mode, in which the beam size (e.g., beam cross-sectional area) is increased but in which the energy density is decreased over that at the confocal position. In another embodiment, the second homogenizer 112B can be movable via the homogenizing optics adjustment device 114 (instead of or in addition to movement of the first homogenizer 112A), to facilitate a change in the fluence of the laser beam.

The energy density (e.g., fluence) of the laser beam spot, generated by the combination of the laser source 110, the pair of homogenizing optics 112 (a first homogenizer 112A; and a second homogenizer 112B), and the homogenizing optics adjustment device 114 of the ablation system 105, can be generally expressed by the following equation:

$$\frac{E}{A*10^{-5}} = \text{Energy Density}$$

where $E$ = laser energy (e.g., mJ)

$A$ = beam cross-sectional area

Energy Density (e.g., J/cm$^2$)

In the case where the beam is circular in cross-section, the energy density can be more particularly expressed by the following equation:

$$\frac{E}{\left(\frac{D}{2}\right)^2 * \pi * 10^{-5}} = \text{Energy Density}$$

where $E$ = laser energy (e.g., mJ)

$D$ = beam diameter (e.g., cm)

Energy Density (e.g., J/cm$^2$)

In the case where the beam is rectangular in cross-section (e.g., a beam from an excimer laser), the energy density can be more particularly expressed by the following equation:

$$\frac{E}{L*W*10^{-5}} = \text{Energy Density}$$

where $E$ = laser energy (e.g., mJ)

$L$ = beam cross-sectional length (e.g., cm)

$W$ = beam cross-sectional length (e.g., cm)

Energy Density (e.g., J/cm$^2$)

The laser-ablation-based analytical system 100 may be controlled by the computing system 120, having a processor configured to execute computer readable program instructions (i.e., the control logic) from a non-transitory carrier medium (e.g., storage medium such as a flash drive, hard disk drive, solid-state disk drive, SD card, optical disk, or the like). The computing system 120 can be connected to various components of the analytic system, either by direct connection, or through one or more network connections (e.g., local area networking (LAN), wireless area networking (WAN or WLAN), one or more hub connections (e.g., USB hubs), and so forth). For example, the computing system 120 can be communicatively coupled (e.g., hardwired or wirelessly) to the controllable elements (e.g., laser source 110, homogenizing optics adjustment device 114, beam conditioning optics 116, and/or spectrometer 118) of the given laser-ablation-based analytical system 100. The program instructions, when executing by the processor, can cause the computing system 120 to control the given laser-ablation-based analytical system 100. In an implementation, the program instructions form at least a portion of software programs for execution by the processor. If the ablation system 105 is to be separately employed, it is to be understood that it may be controlled by a computing system similar to the computing system 120.

The processor provides processing functionality for the computing system and may include any number of processors, micro-controllers, or other processing systems, and resident or external memory for storing data and other information accessed or generated by the computing system 120. The processor is not limited by the materials from which it is formed or the processing mechanisms employed therein and, as such, may be implemented via semiconductor(s) and/or transistors (e.g., electronic integrated circuits (ICs)), and so forth.

The non-transitory carrier medium is an example of device-readable storage media that provides storage functionality to store various data associated with the operation of the computing system 120, such as a software program, code segments, or program instructions, or other data to instruct the processor and other elements of the computing system to perform the techniques described herein. The carrier medium may be integral with the processor, stand-alone memory, or a combination of both. The carrier medium may include, for example, removable and non-removable memory elements such as RAM, ROM, Flash (e.g., SD Card, mini-SD card, micro-SD Card), magnetic, optical, USB memory devices, and so forth. In embodiments of the computing system 120, the carrier medium may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The computing system 120 can include one or more displays to display information to a user of the computing system 120. In embodiments, the display may comprise a CRT (Cathode Ray Tube) display, an LED (Light Emitting Diode) display, an OLED (Organic LED) display, an LCD (Liquid Crystal Diode) display, a TFT (Thin Film Transistor) LCD display, an LEP (Light Emitting Polymer), or PLED (Polymer Light Emitting Diode) display, and so forth, configured to display text and/or graphical information such as a graphical user interface. The display may be backlit via a backlight such that it may be viewed in the dark or other low-light environments. The display may be provided with a touch screen to receive input (e.g., data, commands, etc.) from a user. For example, a user may operate the computing system 120 by touching the touch screen and/or by performing gestures on the touch screen. In some embodiments, the touch screen may be a capacitive touch screen, a resistive touch screen, an infrared touch screen, combinations thereof, and the like. The computing system 120 may further include one or more input/output (I/O) devices (e.g., a keypad, buttons, a wireless input device, a thumbwheel input device, a trackstick input device, and so on). The I/O devices may include one or more audio I/O devices, such as a microphone, speakers, and so on.

The computing system 120 may also include a communication module representative of communication functionality to permit computing device to send/receive data between different devices (e.g., components/peripherals) and/or over the one or more networks. The communication module may be representative of a variety of communication components and functionality including, but not necessarily limited to: a browser; a transmitter and/or receiver; data ports; software interfaces and drivers; networking interfaces; data processing components; and so forth.

The one or more networks are representative of a variety of different communication pathways and network connections which may be employed, individually or in combinations, to communicate among the components of the laser-ablation-based analytical system 100. Thus, the one or more networks may be representative of communication pathways achieved using a single network or multiple networks. Further, the one or more networks are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth. Examples of wireless networks include but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

The computing system 120 is described as including a user interface, which is storable in memory (e.g., the carrier medium) and executable by the processor. The user interface is representative of functionality to control the display of information and data to the user of the computing system via the display. In some implementations, the display may not be integrated into the computing system and may instead be connected externally using universal serial bus (USB), Ethernet, serial connections, and so forth. The user interface may provide functionality to allow the user to interact with one or more applications of the computing system by providing inputs (e.g., sample identities, desired dilution factors, standard identities, eluent identities/locations, fluid addition flow rates, etc.) via the touch screen and/or the I/O devices. For example, the user interface may cause an application programming interface (API) to be generated to expose functionality to an online dilution control module to configure the application for display by the display or in combination with another display. In embodiments, the API may further expose functionality to configure an inline dilution control module to allow the user to interact with an application by providing inputs via the touch screen and/or the I/O devices to provide desired dilution factors for analysis.

In implementations, the user interface may include a browser. The browser enables the computing device to display and interact with content such as a webpage within the World Wide Web, a webpage provided by a web server in a private network, and so forth. The browser may be configured in a variety of ways. The browser may be a web browser suitable for use by a full resource device with substantial memory and processor resources (e.g., a smart phone, a personal digital assistant (PDA), etc.).

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between the components in the laser-ablation-based analytical system 100, for example, can be wired, wireless, or some combination thereof. The program code can be stored in one or more device-readable storage media, an example of which is the non-transitory carrier medium associated with the computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An ablation system, comprising:
    a laser source for generating a laser beam;
    a set of homogenizing optics for receiving the laser beam, the homogenizing optics including a first homogenizer and a second homogenizer, the first homogenizer having a different microlens array type than the second homogenizer;
    a homogenizing optics adjustment device carrying the homogenizing optics, the homogenizing optics adjustment device configured to selectably adjust the position of at least one of the first homogenizer or the second homogenizer to change a size of the laser beam, a change in size of the beam changing the fluence thereof, the laser beam configured to ablate a material upon passing through the first homogenizer and the second homogenizer; and
    a control system communicatively coupled with the homogenizing optics adjustment device, the control system configured to cause the homogenizing optics adjustment device to adjust the position of at least one of the first homogenizer or the second homogenizer according to at least a first mode and a second mode of the ablation system, the first mode configured to adjust the size of the laser beam between a confocal beam size and a minimum beam size, the second mode configured to adjust the size of the laser beam between the confocal beam size and a maximum beam size.

2. The ablation system of claim 1, wherein the beam size is adjustable to any size in a range including a minimum beam size and a maximum beam size.

3. The ablation system of claim 1, wherein the position of the first homogenizer is adjustable.

4. The ablation system of claim 1, wherein the ablation system is incorporated within a laser-ablation based analytical system, the laser-ablation based analytical system including a spectrometer, the spectrometer configured to receive and analyze the ablated material.

5. The ablation system of claim 1, wherein the homogenizing optics adjustment device is configured to selectably adjust the position of at least one of the first homogenizer and the second homogenizer to increase a cross sectional area of the laser beam and concordantly decrease the fluence thereof.

6. An ablation system, comprising:
    a laser source for generating a laser beam;
    a set of homogenizing optics for receiving the laser beam, the homogenizing optics including a first homogenizer and a second homogenizer, the first homogenizer having a different microlens array type than the second homogenizer;
    a homogenizing optics adjustment device carrying the first homogenizer and the second homogenizer, the homogenizing optics adjustment device configured to selectably adjust the position of at least one of the first homogenizer or the second homogenizer to change a cross section of the laser beam, the laser beam configured to ablate a sample after passing through the first homogenizer and the second homogenizer; and
    a control system communicatively coupled with the homogenizing optics adjustment device, the control system configured to cause the homogenizing optics adjustment device to adjust the position of at least one of the first homogenizer or the second homogenizer according to at least a first mode and a second mode of the ablation system, the first mode configured to adjust the size of the laser beam between a confocal beam size and a minimum beam size, the second mode configured to adjust the size of the laser beam between the confocal beam size and a maximum beam size.

7. The ablation system of claim 6, wherein the position of the first homogenizer is adjustable.

8. The ablation system of claim 6, wherein the ablation system is incorporated within a laser-ablation based analytical system.

9. The ablation system of claim 8, wherein the laser-ablation based analytical system comprises a spectrometer, the spectrometer configured to receive and analyze the ablated sample.

10. The ablation system of claim 6, wherein the homogenizing optics adjustment device is configured to selectably adjust the position of at least one of the first homogenizer and the second homogenizer to increase the cross section of the laser beam and concordantly decrease a fluence thereof.

11. The ablation system of claim 6, wherein the homogenizing optics adjustment device is configured to selectably adjust the position of at least one of the first homogenizer and the second homogenizer to decrease the cross section of the laser beam and concordantly increase a fluence thereof.

12. A laser-ablation based analytical system, comprising:
    a laser source for generating a laser beam;
    a set of homogenizing optics for receiving the laser beam, the homogenizing optics including a first homogenizer and a second homogenizer, the first homogenizer having a different microlens array type than the second homogenizer;
    a motorized homogenizing optics adjustment device carrying the first homogenizer and the second homogenizer, the motorized homogenizing optics adjustment device configured to selectably adjust the position of at least one of the first homogenizer or the second homogenizer to change a size of the laser beam, the laser beam configured to ablate a material after passing through the first homogenizer and the second homogenizer;
    a control system communicatively coupled with the motorized homogenizing optics adjustment device, the control system configured to cause the motorized homogenizing optics adjustment device to adjust the position of at least one of the first homogenizer or the second homogenizer according to at least a first mode and a second mode of the ablation system, the first mode configured to adjust the size of the laser beam between a confocal beam size and a minimum beam size, the second mode configured to adjust the size of the laser beam between the confocal beam size and a maximum beam size; and a spectrometer configured to receive and analyze the ablated material.

13. The laser-ablation based analytical system of claim 12, wherein the size of the laser beam is adjustable in a range including a minimum beam size and a maximum beam size.

14. The laser-ablation based analytical system of claim 12, wherein the microlens array type of one of the first homogenizer or the second homogenizer comprises one of a square microlens array or a fly's eye microlens array.

15. The laser-ablation based analytical system of claim 12, wherein the motorized homogenizing optics adjustment device is configured to selectably adjust the position of at least one of the first homogenizer and the second homogenizer to increase the size of the laser beam and concordantly decrease a fluence thereof.

16. The laser-ablation based analytical system of claim 12, wherein the motorized homogenizing optics adjustment device is configured to selectably adjust the position of at least one of the first homogenizer and the second homogenizer to decrease the size of the laser beam and concordantly increase a fluence thereof.

* * * * *